No. 615,553. Patented Dec. 6, 1898.
D. O. HITE.
MACHINE FOR CUTTING WEEDS.
(Application filed Aug. 19, 1898.)

(No Model.)

Witnesses
L. C. Hills
H. L. Amer

Inventor:
D. O. Hite,
by W. S. Stockbridge
his Attorney.

THE NORRIS PETERS CO., PHOTO-LITHO., WASHINGTON, D. C.

UNITED STATES PATENT OFFICE.

DANIEL ORIN HITE, OF SACRAMENTO, CALIFORNIA.

MACHINE FOR CUTTING WEEDS.

SPECIFICATION forming part of Letters Patent No. 615,553, dated December 6, 1898.

Application filed August 19, 1898. Serial No. 689,014. (No model.)

*To all whom it may concern:*

Be it known that I, DANIEL ORIN HITE, a citizen of the United States, residing at Sacramento, in the county of Sacramento and State of California, have invented certain new and useful Improvements in Machines for Cutting Weeds; and I do hereby declare the following to be a full, clear, and exact description of the invention, such as will enable others skilled in the art to which it appertains to make and use the same.

The invention relates to a machine for cutting weeds, especially adapted for use in vineyards and orchards, where it is frequently necessary to work in close proximity with the vines or trees for destroying the weeds interfering with their growth. It is of that type employing a cutter designed to work under the surface of the ground and at any required depth for effectually cutting the roots and destroying the weeds. It will be understood from the following description and claims, reference being had to the accompanying drawings, in which—

Figure 1:
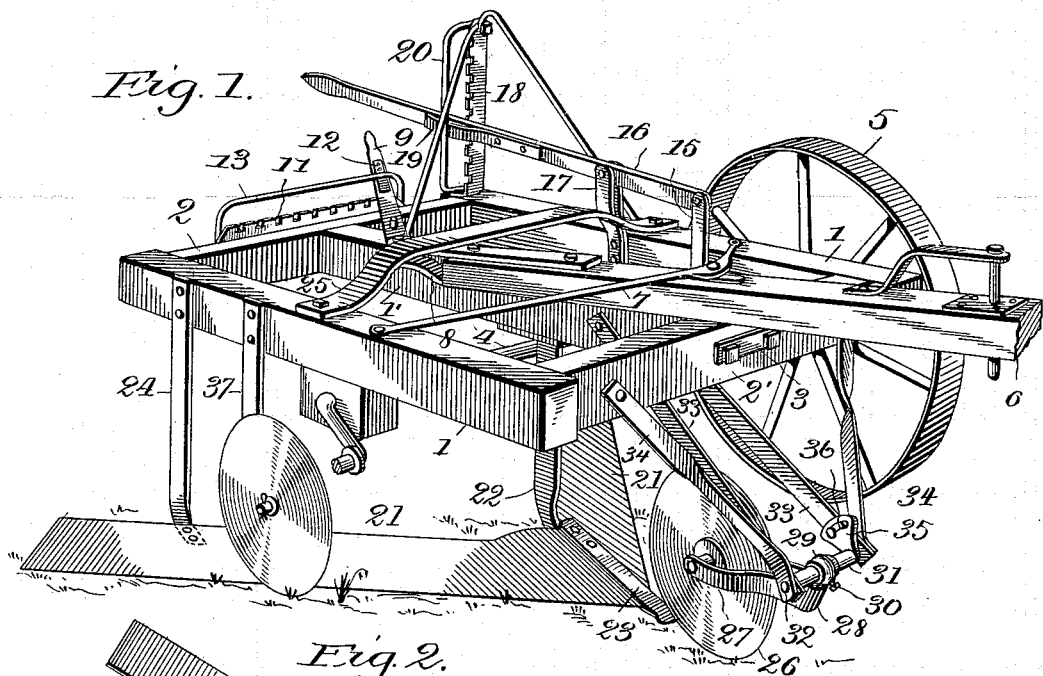
Figure 2:
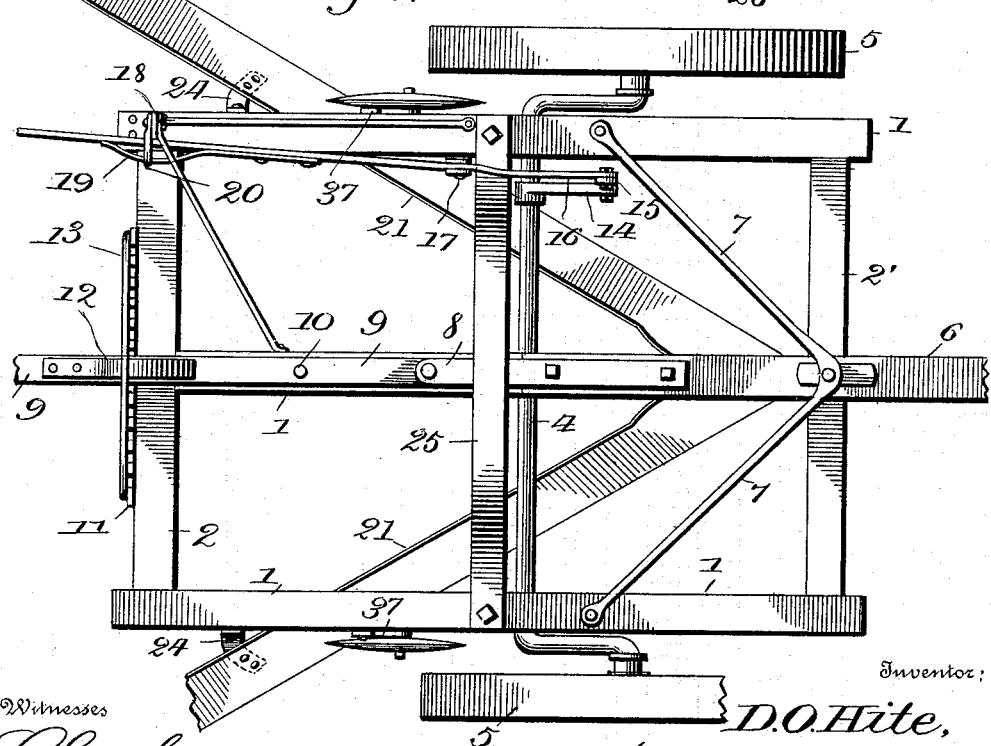

Figure 1 is a perspective view of a machine embodying my improvements, with the carrying-wheel on the adjacent side of the machine shown in dotted lines to show parts which would otherwise be concealed by said wheel. Fig. 2 is a plan or top view of the same.

The main frame of the machine, which is of the rectangular form shown, consists of side bars 1 1 and a central longitudinal bar 1', connected at their ends to transverse bars 2 2' in suitable pendent bearings 3. On the side frame-bars 1 is mounted a crank-axle 4 in suitable journals, on the outer ends of which are mounted the carrying-wheels 5.

6 indicates the tongue, pivoted intermediate its ends to the forward frame-bar 2' by an upright bolt connected at its upper end by a suitable angular brace 7 with the side bars of the frame, as shown. Bolted to the rear end of the tongue is a strap-iron 8, which extends in rear of the tongue and is slotted to engage a pin or bolt on the forward end of a lever 9, pivoted intermediate its ends to the central longitudinal bar 1' at 10 and extending at its rear end over a rack-plate 11, with which a suitable pin or rib on the lower face of the lever 9 is adapted to engage for holding the lever at any desired adjustment, being held normally in engagement with said rack by means of a spring 12, underlying a loop or rod 13, extending above the rack 11, as shown. By this arrangement the tongue is adapted to be swung on its pivotal connection with the frame for adapting the machine to run in close proximity with the line or row of trees or vines from which it is desired to remove the weeds.

The crank-axle 4 is provided with the forwardly-extending arm 14, lying substantially in alinement transversely with the crank-arms on which the wheels are mounted, and said arm is connected at its forward end by a link 15 with a lever 16, pivoted intermediate its ends to an upright 17 on the frame, said lever extending rearward across an upright rack-bar 18, with which it is held normally in engagement by means of a spring 19, pressing against a loop-shaped rod 20, secured at its ends to said rack-bar, as shown. The rack-bar has its upper end supported from the main frame by suitable braces, as shown. The rear end of the lever is provided with a handle, by grasping which and overcoming the tension of the spring 19 and by crowding the lever away from the rack-bar 18 the lever can be adjusted for adjusting the crank-axle, and thereby adjusting the height of the frame, for a purpose which will appear.

21 21 indicate two cutter-blades which have their forward ends beveled and brought together in such manner that the blades shall diverge, giving them a V shape, with the point forward, as shown. At said forward end the blades are riveted to a suitable plate underneath for firmly uniting them, or the standard 22, through which said forward end of the cutter is connected with the central longitudinal bar 1' of the frame, may be given a quarter-turn and expanded underneath the joint ends of the cutter-blades, and said blades may be riveted to such expanded end of the standard, thereby giving them a solid support.

23 indicates an angular plate covering a joint between the blades 21 and extending slightly in advance thereof, and the forwardly-extending portion of the standard 22, underlying the joint between the blades 21, may be extended forward, as indicated, and the forward end of the angular plate 23 may be riveted to the forward end of said underlying portion 22, and the same rivets which secure the knives to the standard 22 may be utilized for securing the angular point 23 in place. The blades 21 extend rearwardly and outwardly behind and outside of the carrying-wheels for adapting them to be run in close proximity with the line of vines or trees from which it is desired to remove the weeds. These blades are set in slightly-inclined position, as shown, and are supported adjacent to their rear and outer ends by standards 24, bolted to the sides of the frame, and provided at their lower ends with outwardly-turned foot-flanges underlying the inner raised edges of the knife-bars and bolted thereto. The knives are brought to an edge on their outer forward faces to adapt them to readily cut through the ground underneath the surface thereof and to cut the roots of the weeds for the purpose of effectually destroying the same. By the adjustment of the crank-axle as explained the cutters may be adjusted to cut at any desired depth below the surface of the ground that may be required for effectually destroying the weeds.

25 represents an arched or raised transverse bar secured at its ends to the said bars 1 and overlying the rear end of the tongue or the strap 8 for steadying the lateral movement of the tongue relative to the frame and preventing any vertical movement thereof.

26 represents a revolving colter or circular cutter arranged in advance of the point of the knives and journaled in the rear ends of the arms of a fork 27, said arms uniting at their forward end in a vertical sleeve 28, journaled upon a pendent pivot on a sleeve 29, secured by means of a set-screw 30 to a transverse sleeve 31, mounted on a through-bolt 32, passing through arms to the lower ends of pendent arms and braces secured to the main frame, as will appear.

33 33 represent substantially parallel forwardly-extending arms rigidly secured at their upper rear ends, one upon each side of the longitudinal central frame-bar.

34 34 represent braces secured at their upper ends to the forward frame-bar 2', near the outer ends thereof, said braces extending downward and forward and uniting at their lower ends with the adjacent bars 33, being connected therewith by the through-bolt 32, supporting the sleeve 31. One end of the sleeve 31 is provided with a plate 35, rigid on said sleeve and expanded at its free end and provided therein with a segmental slot 36, through which a set-screw passes into the contiguous arm 33 and by means of which the sleeve 31 can be regulated upon the through-bolt 32 for setting the colter to run to a greater or less depth in the ground, as may be required. By this arrangement of the colter a vertical slit is cut in the ground in advance of the knives, enabling the latter at their junction to readily pass under the ground for raising the same, the slit formed by the colter in advance of the standard 22 effectually guarding the latter against becoming entangled or choked with the weeds which would otherwise accumulate thereon. A similar revolving colter is in practice secured to the lower end of a standard 37 to run in advance of the rear knife-supporting standards 24, said standards 37 being secured to the outer frame-bars 1, one on each side of the frame, as indicated in the drawings, thereby guarding the rear knife-supporting standards also against being clogged by weeds which would otherwise adhere to them. This is regarded as important, as without the revolving colters for cutting the weeds in advance of the knife-supporting standards the latter would speedily become so clogged as to require the frequent stopping of the machine for the removal and destroying of the weeds.

As shown, the machine is adapted to be operated by an attendant walking upon the ground in rear thereof in convenient position to operate the levers 12 and 16; but if desired a suitable seat and support therefor may be secured to the transverse bar on the frame for enabling the attendant to ride upon the machine while guiding and controlling its movement.

By the construction described a simple and compact arrangement of the parts of the machine is secured and one which enables the attendant to cut in close proximity to the vines or row of trees from which it is desired to remove and destroy the weeds.

Having thus described the invention, what is claimed as new, and sought to be secured by Letters Patent, is—

1. In a weed-cutting machine, the combination with the rectangular main frame, the crank-axle journaled in pendent bearings on said frame and the carrying-wheels journaled on the crank by means of said axle, of the converging knife-blades united at their forward ends to a common supporting-standard and extending at their rear ends in rear of and outside of the supporting-wheels, supporting-standards for upholding the rear ends of said knives rigidly secured to the side bars of the main frame, and a revolving colter arranged to run in advance of each of said supporting-standards, for the purpose and substantially as described.

2. In a weed-cutting machine, the combination with the main frame, the crank-axle journaled in pendent bearings on said frame, and the carrying-wheels journaled on the cranks of said axle, of the converging knife-blades united at their forward ends to a common supporting-standard and extending at their rear ends in rear of and outside of the supporting-wheels, supporting-standards for upholding the rear ends of said knives, a revolving colter arranged to run in advance of each of said supporting-standards, a swiveling fork in which the forward colter-shaft is journaled, a vertical pivot on which said fork is mounted, an adjustable horizontal sleeve carrying said pivot, and the pendent, forwardly-extending arms in the forward lower ends of which is secured the horizontal pivot on which said adjustable sleeve is mounted, substantially as described.

In testimony whereof I affix my signature in presence of two witnesses.

DANIEL ORIN HITE.

Witnesses:
WM. J. WEBBER,
C. A. ELLIOTT.